(12) United States Patent
Dennis et al.

(10) Patent No.: US 7,068,271 B2
(45) Date of Patent: Jun. 27, 2006

(54) ASSEMBLY PATTERNS BY FEATURE ASSOCIATION

(75) Inventors: Steven M. Dennis, Wixom, MI (US); Gary R. Smith, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 921 days.

(21) Appl. No.: 09/946,651

(22) Filed: Sep. 5, 2001

(65) Prior Publication Data

US 2003/0048268 A1    Mar. 13, 2003

(51) Int. Cl.
*G06T 17/00* (2006.01)

(52) U.S. Cl. .................. 345/420; 345/419; 345/473

(58) Field of Classification Search ............... 345/420, 345/764
See application file for complete search history.

(56) References Cited

U.S. PATENT DOCUMENTS

| | | | |
|---|---|---|---|
| 5,123,087 A | 6/1992 | Newell et al. | |
| 5,133,052 A | 7/1992 | Bier et al. | |
| 5,444,836 A | 8/1995 | Hollingsworth et al. | |
| 5,572,639 A | 11/1996 | Gantt | |
| 5,577,189 A | 11/1996 | Gay et al. | |
| 5,815,154 A | 9/1998 | Hirschtick et al. | |
| 5,894,310 A | 4/1999 | Arsenault et al. | |
| 6,016,147 A | 1/2000 | Gantt | |
| 6,219,049 B1 | 4/2001 | Zuffante et al. | |
| 6,219,055 B1 | 4/2001 | Bhargava et al. | |

OTHER PUBLICATIONS

John MacKrell. Assembly Design puts the Parts Together. In Computer-Aided Engineering, Oct. 1997, vol. 16 Issue 10, p. 42, 4p.*
Google Groups BETA, Messges from the thread "Component pattern-pattern," http://groups.google.com/groups?h1=en&safe=off&th=b74993733e9952b3,8&seekm=8iaha... pp. 6 © 2001.
Autodesk Inventor—Release 3, "Learn about arranging components in patterns." 1 pg. Jun. 23, 2000.
Autodesk Inventor—Release 3,"To arrange features in a rectangular pattern," 1 pg. Jun. 23, 2000.
Autodesk Inventor—Release 3, "To arrange components in a circular pattern," 1 pg. Jun. 23, 2000.
Autodesk Inventor—Release 3, "To arrange components in a rectangular pattern," 1 pg. Jun. 23, 2000.

(Continued)

*Primary Examiner*—Kee M. Tung
*Assistant Examiner*—Enrique L. Santiago
(74) *Attorney, Agent, or Firm*—Gates & Cooper LLP

(57) ABSTRACT

A method, apparatus, and article of manufacture provide for drawing a graphical element in a computer-implemented drawing program. An existing instance of a graphical element pattern that defines a graphical distribution of multiple occurrences of a source graphical element is identified in a computer-implemented drawing program. A second graphical element is then associated with the existing instance of the graphical element pattern. In response to the associating, multiple occurrences of the second graphical element are positioned in accordance with the graphical element pattern.

36 Claims, 8 Drawing Sheets

OTHER PUBLICATIONS

Autodesk Inventor—Release 3, "Pattern components," 1 pg. Jun. 23, 2000.

Autodesk Inventor—Release 3, "To arrange features in a circular pattern," 1 pg. Jun. 23, 2000.

Autodesk Inventor—Release 3, "Rectangular pattern," pp. 2 Jun. 23, 2000.

Autodesk Inventor—Release 3, "Learn about arranging features in patterns," 1 pg. Jun. 23, 2000.

Autodesk Inventor—Release 3, "Circular pattern," 2 pgs. Jun. 23, 2000.

Autodesk Inventor—Release 3, "Getting Started" pp. 20 Jun. 23, 2000.

SolidWorks Corporation, "Solidworks Corporation Introduces Solidworks © 1999," http://www.solidworks.com/Autorelease/html/prSolidWorks99.htm pp. 4 © 1999.

* cited by examiner

Radial Normal (R2)　　　　　　　　　Source Normal

ASSEMBLY PATTERNS BY FEATURE ASSOCIATION

BACKGROUND OF THE INVENTION

1. Field of the Invention

The present invention relates generally to computer-implemented drawing programs, and in particular, to a method, apparatus, and article of manufacture for drawing a graphical element by associating the graphical element with an existing pattern.

2. Description of the Related Art

Multiple occurrences of a graphical element may be organized into a particular pattern in a drawing program. Further, a user may often desire to organize different graphical elements into the same pattern. However, in the prior art, a pattern is uniquely associated with a single set of graphical elements. Accordingly, multiple similar patterns must be created and used for each set of different graphical elements. Such problems may be better understood by describing drawing programs, graphical elements, and patterns.

Computer-implemented drawing programs are often used to create, view, and modify solid models, assemblies, diagrams, flow charts, blue-prints, etc. (collectively referred to as drawings) in both two dimensions (2D) and three dimensions (3D). The drawings comprise one or more graphical elements arranged in a defined format. In turn, the graphical elements may comprise one or more smaller graphical elements/entities.

Multiple occurrences of the same graphical element may be organized into a particular pattern. For example, multiple occurrences of the same graphical element may be organized into a rectangular, circular, or user-defined pattern. Further, the same pattern may be used for multiple different graphical elements. Such similarities may occur when the user desires to create an object such that different parts work cooperatively together. For example, a user may desire to create a bolt (or set of bolts) and a hole (or set of holes) that the bolt will be inserted into. Accordingly, a series of bolt graphical elements may be organized into a rectangular pattern that is identical to a rectangular pattern used for a series of hole graphical elements.

A particular pattern (e.g., rectangular or circular) may be selected from a list and layout details may be specified by the user (e.g., the number of rows and columns for a rectangular pattern or the diameter for a circular pattern). Once the pattern for a particular graphical element is selected and defined, multiple occurrences of the particular graphical element are displayed in the selected and defined pattern. Further, the multiple occurrences of the graphical element and the pattern are identified as mutually and exclusively belonging to each other. Thereafter, a change to the pattern is reflected in the display of the multiple graphical element occurrences.

However, once a particular pattern is defined for a graphical element, the instance of the particular pattern is exclusive and independent from any other instances. Accordingly, even if the same pattern is used for two different graphical elements, each pattern must be modified independently from the other pattern. Thus, in the above example, if a user modifies the number of holes, then the user must also independently modify the number of bolts so that they correspond. The prior art does not provide a method to create or associate a particular instance of a pattern with multiple different graphical elements.

SUMMARY OF THE INVENTION

One or more embodiments of the invention provide a method, apparatus, and article of manufacture for drawing a graphical element in a computer-implemented drawing program such as a solid modeling program. A feature of a drawing is obtained. The feature is patterned pursuant to user instructions. Such a feature may be in a variety of geometric shapes including rectangular, circular, or a user specified design.

The user may then associate an existing component with the existing pattern. A dialog window is displayed that allows the user to select the component and identify the pattern. Once the pattern is selected, a textual identifier for the pattern is displayed in the dialog window. Thereafter, multiple occurrences of the selected component are obtained and positioned in accordance with the identified/selected pattern.

When the pattern is changed (i.e., the number of occurrences is modified, the number of rows/columns in a rectangular pattern are modified, the diameter of a circular pattern is modified, etc.), any components or features associated with the pattern are automatically updated to reflect the change. Further, an occurrence of the component or feature that is an element of a pattern may be individually edited and manipulated (e.g., suppressed, deleted, etc.). Additionally, the association between the pattern and the component/feature may be broken.

By breaking the association, a fully configured pattern matching that of the original associated pattern may be obtained and applied to the component/feature. Thereafter, the user has the ability to manipulate the pattern independently from the original pattern In addition to drawing a graphical element as described above, a browser window may assist the user in selecting, identifying, and editing a feature, a component, a pattern, and/or an associations to a pattern.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

A unique pattern is created and used in an assembly by associating a component to a particular design feature that allows the component to be instanced based on the occurrence of the feature rather than some specific mathematical arrangement.

Hardware Environment

Figure 1:
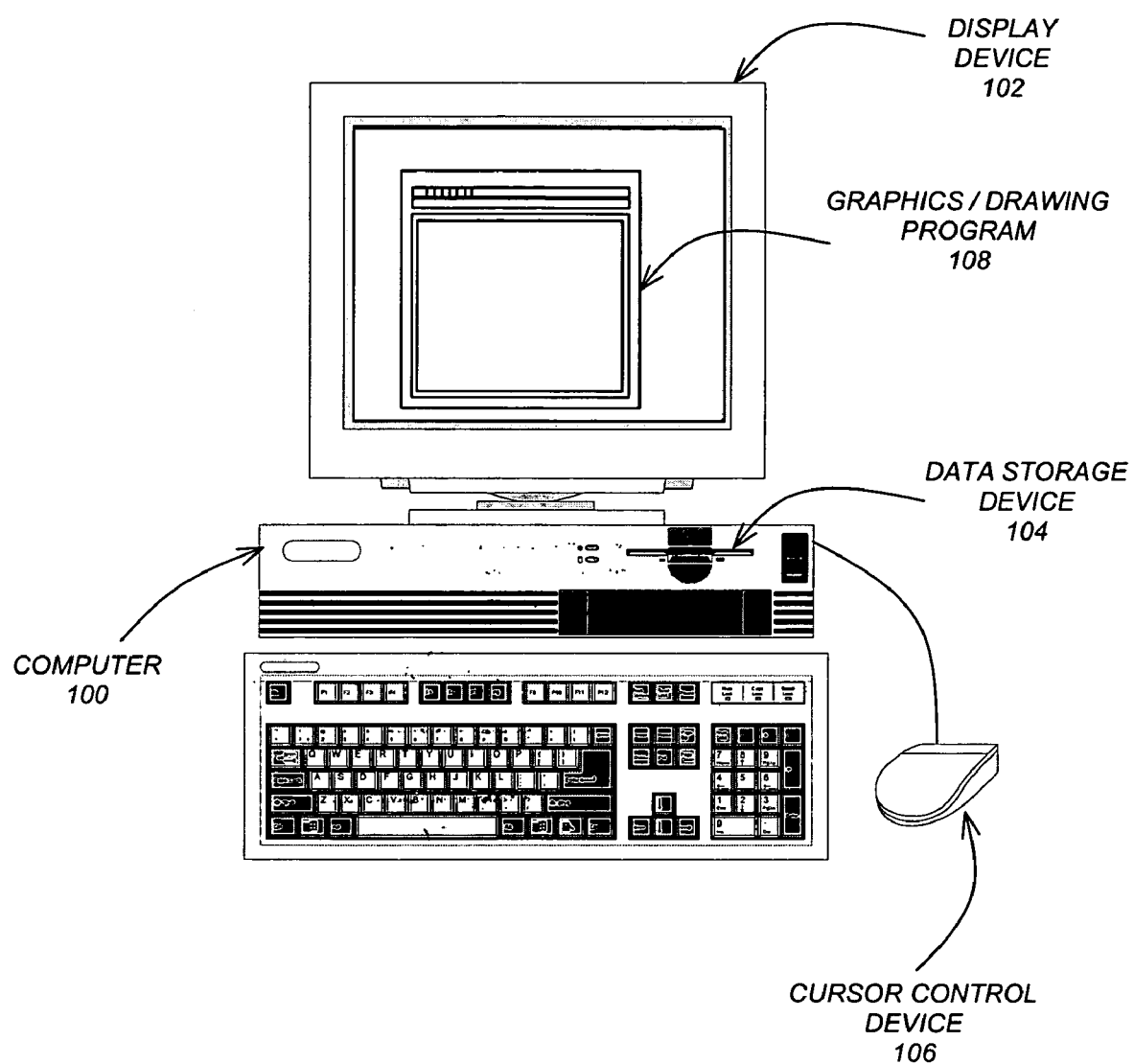
FIG. 1 is an exemplary hardware and software environment used to implement one or more embodiments of the invention.

FIG. 1 is an exemplary hardware and software environment used to implement one or more embodiments of the invention. Embodiments of the invention are typically implemented using a computer 100, which generally includes, inter alia, a display device 102, data storage devices 104, cursor control devices 106, and other devices. Those skilled in the art will recognize that any combination of the above components, or any number of different components, peripherals, and other devices, may be used with the computer 100.

One or more embodiments of the invention are implemented by a computer-implemented graphics program 108, wherein the graphics program 108 is represented by a window displayed on the display device 102. Generally, the graphics program 108 comprises logic and/or data embodied in or readable from a device, media, carrier, or signal, e.g., one or more fixed and/or removable data storage devices 104 connected directly or indirectly to the computer 100, one or more remote devices coupled to the computer 100 via a data communications device, etc.

Those skilled in the art will recognize that the exemplary environment illustrated in FIG. 1 is not intended to limit the present invention. Indeed, those skilled in the art will recognize that other alternative environments may be used without departing from the scope of the present invention.

SOFTWARE EMBODIMENTS

Graphics/drawing program 108 is configured to create, view, and modify drawings (as set forth in the background) displayed on display device 102 in 2D and/or 3D. Such drawings comprise one or more graphical elements. A graphical element may comprise a part or a component. A part or a component may comprise any 2D or 3D geometrical shape or entity that may or may not represent a real-world item such as a washer, bolt, cylinder, cube, nozzle, etc. Each graphical element is made up of one or mote features that provide characteristics for the graphical element. For example, a cylinder with a hole may have a cylinder feature and a hole feature.

In accordance with one or more embodiments of the invention, multiple occurrences of a feature or a component may be patterned. The pattern typically comprises a regular distribution of the feature or component in an ordered fashion such as a rectangular or circular (polar) pattern. However, non-regular user-defined patterns may also be created. When patterned, a pattern object is created. The pattern object may be located hierarchically at a level equivalent to other components or features in the drawing (depending on what is being patterned).

Figure 2:
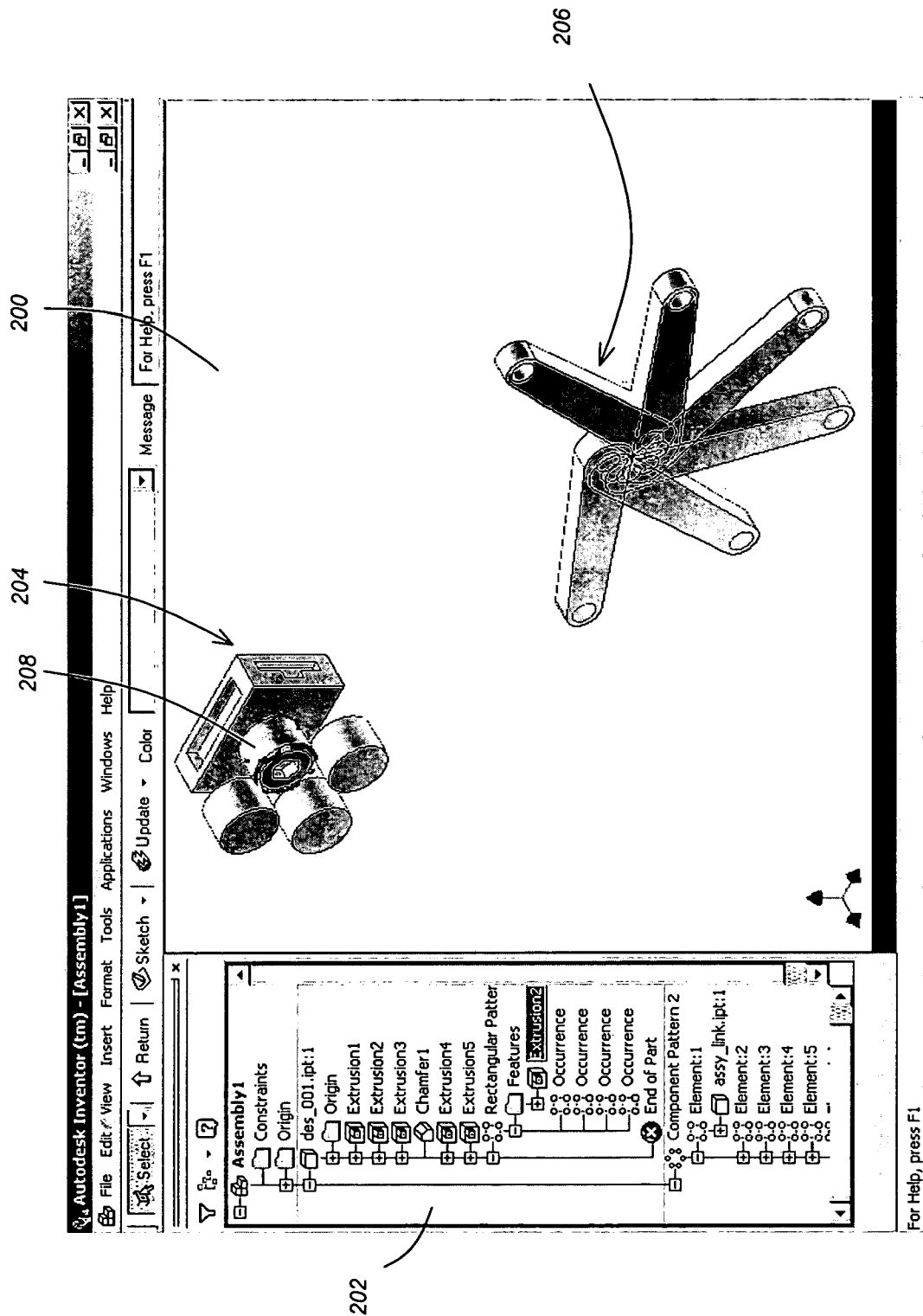
FIG. 2 is a screen shot of an application that indicates the use of patterns in accordance with one or more embodiments of the invention.

FIG. 2 is a screen shot of application 108 that indicates the use of patterns in accordance with one or more embodiments of the invention. Display area 200 contains the graphical representations of the features and/or components in the drawing. Browser window 202 shows the structure of parts, assemblies, and drawings in the active file. Display area 200 contains two primary components 204 and 206. The components 204 and 206 are listed in the browser window 202 as "des_001.ipt:1" 204 and "Component Pattern 2" 206.

Both components 204 and 206 contain multiple features such as feature 208 of component 204. The features for each component 204 and 206 are listed in browser window 202 under the appropriate component 204 and 206. For example, the features of component 204 are listed as "Extrusion1", "Extrusion2", "Extrusion3", "Chamfer4", "Extrusion5", and "Rectangular Pattern". The features of component 206 are not currently listed in browser window 202. To view the features of component 206, the component must be expanded by selecting the "+" symbol.

As illustrated, two different types of patterns are displayed in FIG. 2. Multiple occurrences of feature 208 have been arranged in a rectangular pattern. Accordingly, in browser window 202, the rectangular pattern element identifies the relevant information. As indicated in browser window 202, the feature 208 patterned is "Extrusion 2" of component 204. Further, there are four "occurrences" of the "Extrusion 2" feature 208.

The other pattern appearing in FIG. 2 is of multiple occurrences of component 206 arranged in a circular pattern. Instead of listing the pattern within the component 206 as when a feature is patterned (e.g., with feature 208 and component 204), the actual element or component listing is identified as a component pattern—"Component Pattern 2" in browser window 202. Listed within the component pattern object displayed in the browser window 202 are the various elements within the pattern. Each element is an occurrence of the component 206. Accordingly, there are six (6) elements listed in browser window 202 for each occurrence of component 206 in the pattern. Under each element are details for the element. For example, as viewed under "Element:1", the part is listed as "assy_link.ipt:1". If the "assy_link.ipt:1" entry were expanded (e.g., by selecting the "+"), the various features for the part would be listed.

As items are selected in browser window 202, the selection is reflected in window 200. For example, "Extrusion2" 208 is currently selected in browser window 202 and is reflected in display window 200 by different coloring of the edges of feature 208.

Figure 3:
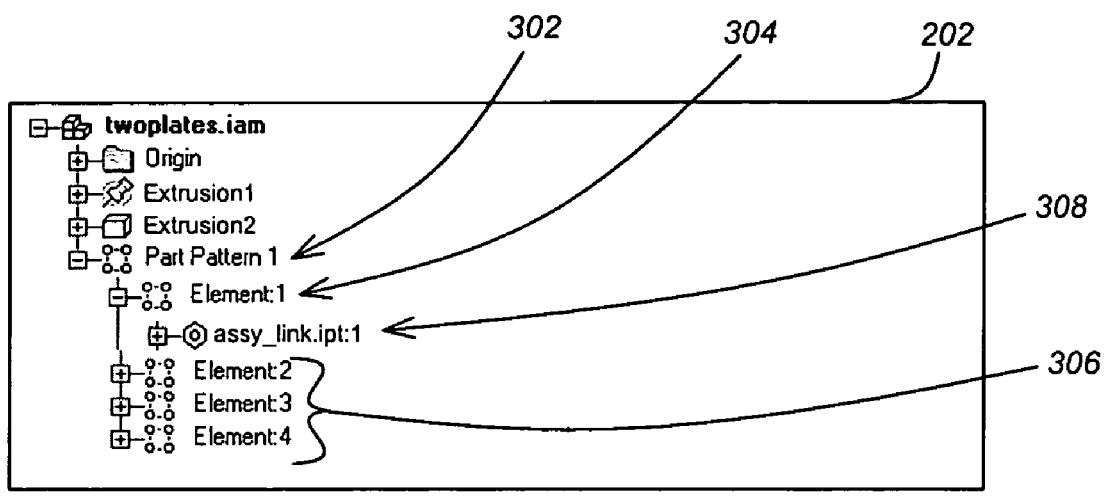
FIG. 3 illustrates the organizational structure of a component pattern as listed in a browser window in accordance with one or more embodiments of the invention.

FIG. 3 illustrates the organizational structure of a component pattern as listed in a browser window 202 in accordance with one or more embodiments of the invention. As described herein, a pattern of components and/or features 208 may be represented in an object-oriented environment or other capable environment with the constituent elements as set forth. A pattern object 302 is the highest level representation of the pattern within the browser window 202. The pattern object 302 represents an instance of a graphical element pattern. In other words, the pattern object 302 represents the rectangular, circular, or user-defined array of positions containing one source graphical element 304 and one to "n" pattern elements 306 that each contain 1 to "n" pattern instances 308.

The source element 304 is the initial component selection(s) that is used to define the rest of the pattern. In one or more embodiments, the source element 304 is always the first element displayed under the pattern object 302 in the browser window 202. The pattern element 306 is the first level collector contained under the pattern object 302. In other words, each pattern element 306 is an occurrence of the source element 304 in the pattern object 302.

One or more pattern instances 308 make up a pattern element 306. A pattern instance 308 is a component or feature instance created to populate a position of the pattern object 302. As illustrated in FIG. 3, both pattern instances 308 and pattern elements 306 may be expanded as indicated by the "+" symbols. In addition, a "missing tooth" instance 108 (not displayed in FIG. 3) may be used to indicate a position within the logical definition of the pattern that is skipped, eliminated, or otherwise suppressed.

As illustrated in FIG. 3, the Part Pattern 1 represents the Component Pattern 2 of FIG. 2. The icon in the browser window of FIG. 3 illustrates Part Pattern 1 as a rectangular pattern (i.e., an icon comprised of four dots in a square). However, the icon in the browser window of FIG. 2 illustrates the pattern as a circular pattern (i.e, an icon comprised of six dots in a circle). If the pattern of component 206 displayed in FIG. 2 were a rectangular pattern, the icons would appear as that shown in FIG. 3.

The pattern objects of FIG. 2 (i.e., components 204 and 206) are independent and not associated with each other. In accordance with one or more embodiments of the invention, instead of creating an independent pattern when desired, a pattern of components and/or features is created by associating a feature or component with an existing pattern of components and/or features. Thus, a pattern is introduced by associating a first component/feature in a drawing to a second existing particular design component/feature that allows the first component/feature to be instanced based on the occurrence of the second component/feature rather than some specific mathematical arrangement (e.g., circular, rectangular, etc.).

By creating a pattern by association, instances of a component and/or feature become dependent on an existing pattern. Thereafter, any changes made to the existing pattern will be reflected in the associated pattern. For example, a pattern of holes can be populated with bolt fasteners that maintain an associative relationship to the pattern. If the number of holes changes, the number of bolts changes accordingly.

Figure 4A:
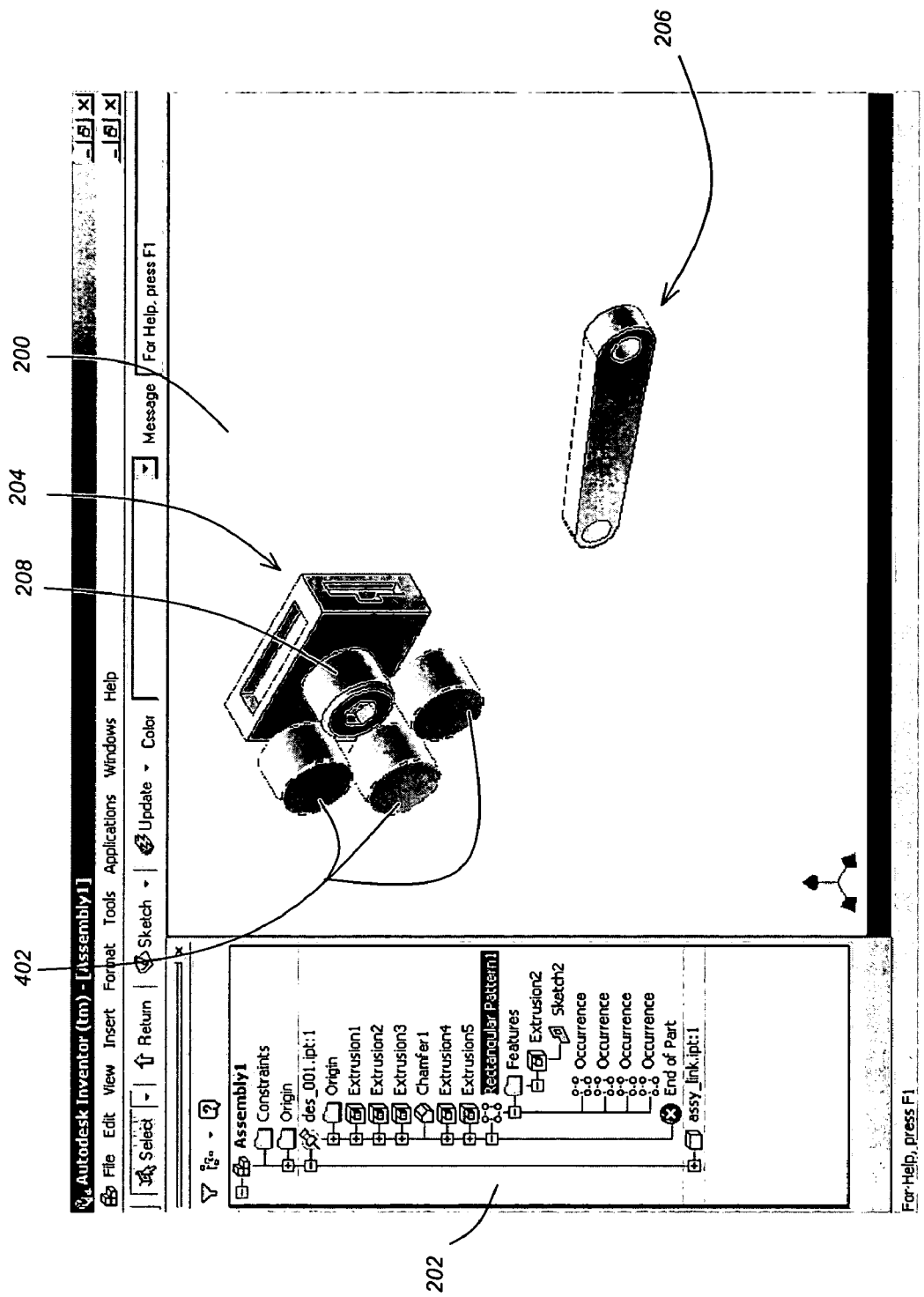
FIGS. 4A and 4B illustrate the use and creation of a pattern by association in accordance with one or more embodiments of the invention.
Figure 4B:
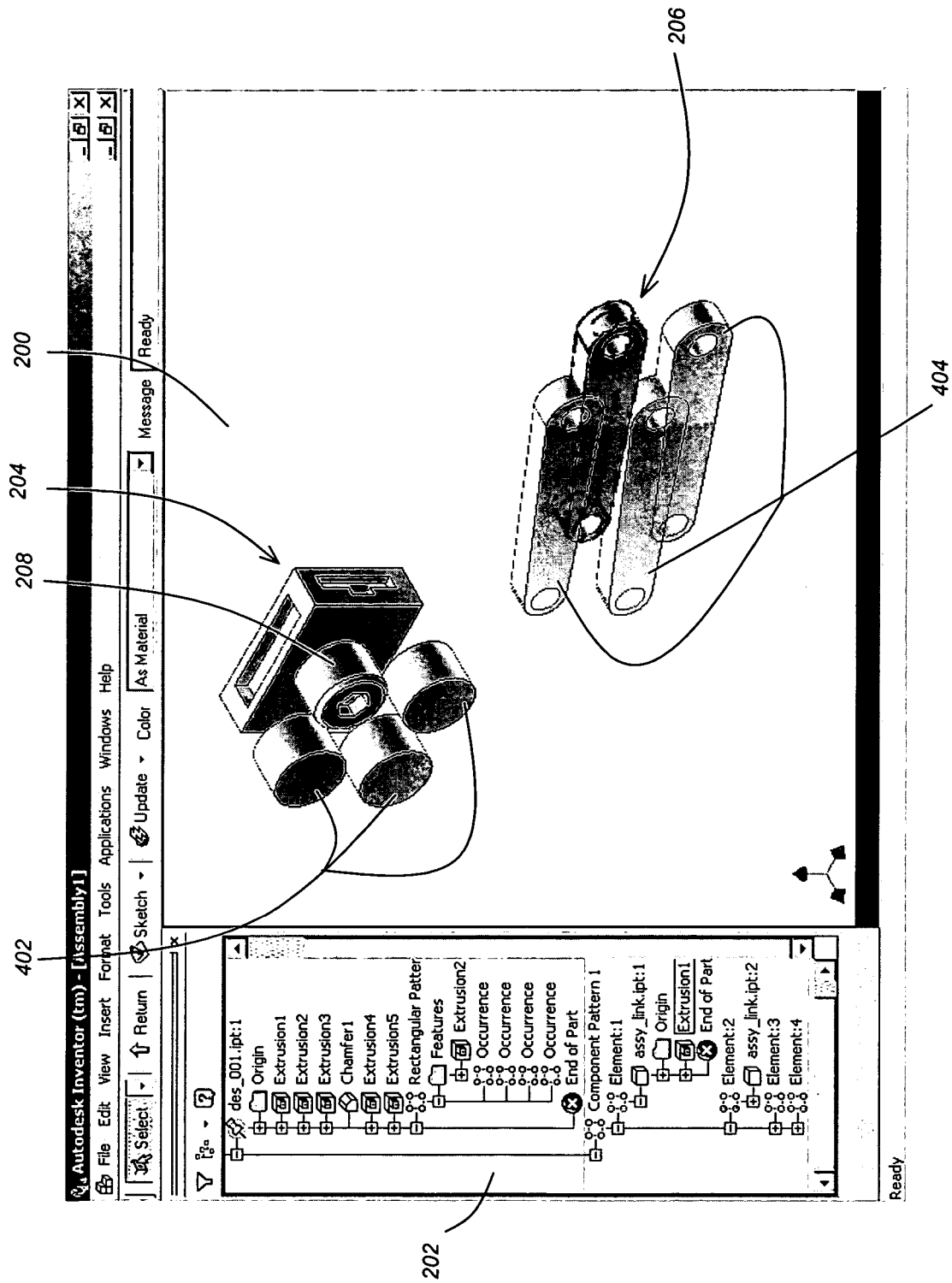

FIGS. 4A and 4B illustrate the use and creation of a pattern by association. In FIG. 4A, component 204 contains a rectangular pattern established by source feature (Extrusion2) 208 and three (3) occurrences 402 of source feature 208. The feature pattern 402 is indicated in browser window 202 by the "Rectangular Pattern1" object. Component 206 is a single component that will be patterned by association with feature pattern 402. Component 206 is indicated in browser window 202 by the "assy_link.ipt:1" object.

FIG. 4B illustrates the creation of a pattern by association. In FIG. 4B, component 206 was selected and associated with the feature pattern 402. Once associated with the feature pattern 402, multiple occurrences of component 206 are automatically obtained and arranged in the same pattern 404 as that of feature 402. The existing structure/object may then be referred to as a pattern component. The listing of the component and element instances 306 are indicated in browser window 202 under the "Component Pattern 1" object 302.

Once the component 206 has been associated with feature pattern 402, if an occurrence of feature pattern 402 is added, removed, suppressed, etc., the component pattern 404 mimics the addition, removal, suppression, etc. Thus, as the design of the assembly in window 200 evolves and components are modified, associated components are automatically updated such that fewer manual actions are necessary to accurately reflect the designer's intent.

Figure 5:
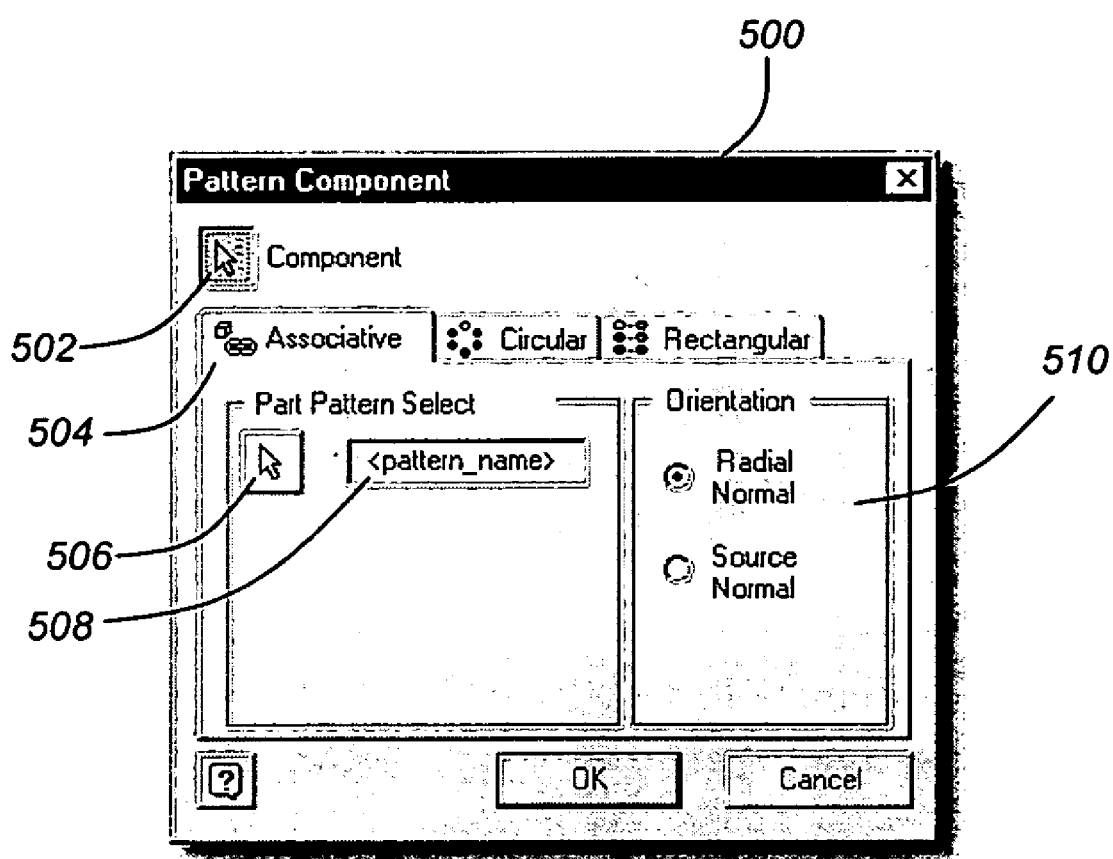
FIG. 5 illustrates a dialog window for associating a component with an existing feature pattern in accordance with one or more embodiments of the invention.

FIG. 5 illustrates a dialog window for associating a component with an existing feature pattern in accordance with one or more embodiments of the invention. To display dialog window 500, the user elects to pattern a component. To associate a component with an existing pattern, the component (e.g., component 206) may be selected from browser window 202 or from display area 200. Thereafter, the user elects to pattern the component (e.g., by selecting a pattern component button). Alternatively, the user may first elect to pattern the component (without selecting a component first). By depressing button 502, the user is provided with the ability to select a component to be patterned from display area 200 or browser window 202.

Once a component has been selected, the desired type of pattern may be selected using the appropriate tab. To associate the selected component with an existing pattern, the associative tab 504 (and not the circular or rectangular tab) must be active. The user then activates button 506. Alternatively, button 506 may be activated automatically once a component is selected. The activation of button 506 allows the user to identify/select a specific existing pattern to associate the selected component with. Once a pattern has been selected, a textual identifier for the pattern (e.g., a pattern name) is displayed in box 508. The textual identifier is identical to the pattern object name as displayed in browser window 202.

Figure 6:
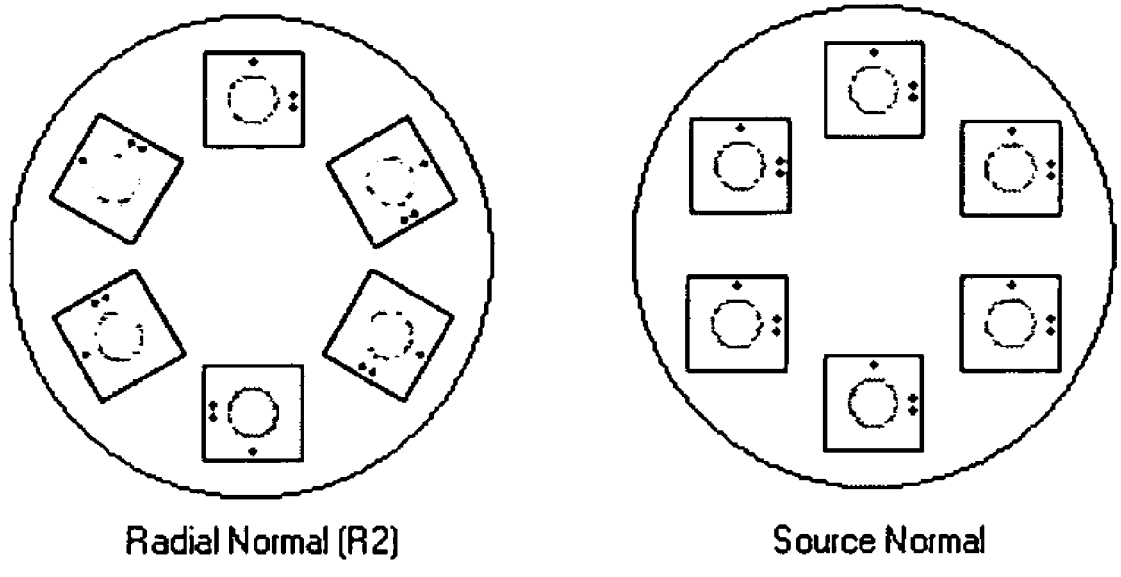
FIG. 6 illustrates possible orientations of a pattern in accordance with one or more embodiments of the invention.

Additionally, an orientation option 510 may be available. The orientation option allows the user to specify the axial orientation of circular patterns as either "Radial Normal" or "Source Normal". These different options are illustrated in FIG. 6.

Once a component (e.g., component 206) has been associated with an existing pattern object (e.g., pattern object 402) through the creation of a pattern component, multiple occurrences of the component (e.g., component 206) are displayed in window 200. Thereafter, the type of pattern is classified as associative.

Additionally, if the user selects the pattern component 404 in display window 200 or browser window 202, a dialog window is displayed. The dialog window permits the user to edit the component to be used as the source. Further, the dialog window permits the user to edit/select the pattern that the source component is associated with. Such a dialog window may comprise tab 504 and button 502 of FIG. 5.

The components within a component pattern are expandable within browser window 202 and can be acted upon similar to other components. For example, the following attributes may be adjusted for such components: edited in-place (affects all), visibility (affects individual), display style over ride (affects individual), constraint pairing partner, and suppress. Additionally, the following may be valid actions on a component object within an assembly: edit, delete, create note, and visibility toggle. However, if a parent pattern (e.g., a feature pattern) is deleted, the dependent component pattern is also deleted. To prevent such a deletion by mistake, a warning message may be displayed to the user in a dialog window when a user attempts to delete a parent pattern.

Individual components, pattern elements, or pattern instances may be separately deleted/suppressed and the user may optionally break the association between the source component and the selected feature pattern while retaining the pattern. For example, a user may elect to mimic a pattern of a feature and thereafter alter the pattern so that there is not an identical match. To accomplish this goal, a user may be given the option of retaining a pattern subsequent to breaking an association. When the user elects such an option, the original structure of the feature pattern (e.g., circular or rectangular) may then be copied and used as the base for the component pattern. Additionally, by allowing the user to break the association, when a parent pattern (e.g., the feature pattern) is deleted, the dependent component pattern is not also deleted.

Figure 7:
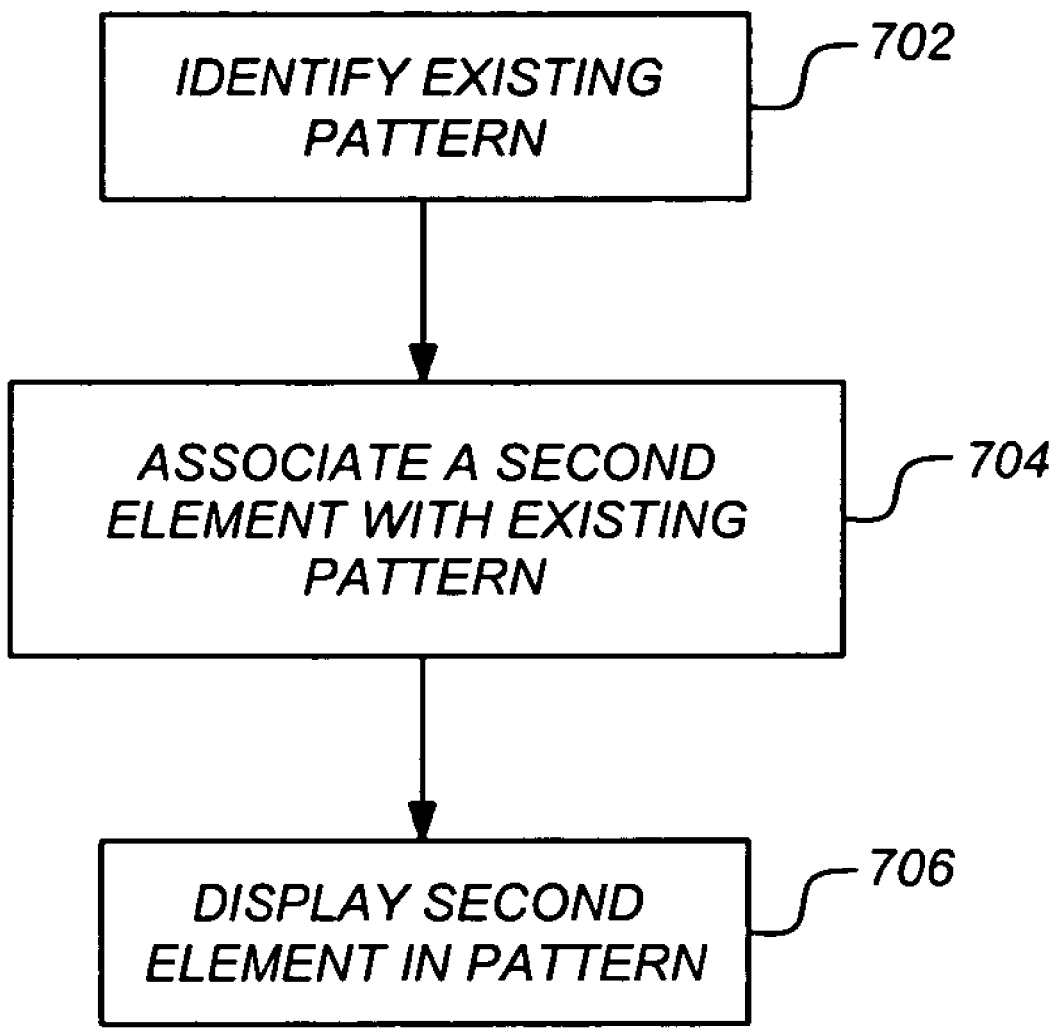
FIG. 7 is a flow chart illustrating the pattern creation by association in accordance with one or more embodiments of the invention.

FIG. 7 is a flow chart illustrating the pattern creation by association in accordance with one or more embodiments of the invention. At step 702, an existing instance of a graphical element pattern is identified. Such a graphical element pattern defines a graphical distribution of multiple occurrences of a source graphical element in a computer-implemented drawing program. For example the distribution may be circular, rectangular, or user-defined. As described above, the existing graphical element pattern may be a pattern of a feature on a component or a pattern of components.

At step 704, a second graphical element is associated with the existing instance of the graphical element pattern. Such a graphical element may be a feature of a component or a component itself At step 706, in response to the association, multiple occurrences of the second graphical element are positioned in accordance with the graphical element pattern.

As described above, the existing graphical element pattern may be represented by a pattern object that comprises the source graphical element and one or more pattern graphical elements with each pattern graphical element representing an occurrence of the source graphical element. Further, the one or more pattern graphical elements may contain one or more pattern instances with each pattern instance representing a graphical part of the pattern graphical element.

Whether represented in an object-oriented environment or otherwise, the structure of the patterns and their elements may be displayed hierarchically with expandable lines in a browser window as described above. Additionally, a modification to the existing instance of the graphical element pattern is reflected in the multiple occurrences of the second graphical element (as long as the association is not broken). Such a modification may adjust the number of the multiple occurrences of the source element which is then reflected in the number of occurrences of the second graphical element.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations ate possible in light of the above teaching. It is intended that the scope of the invention be limited not by this detailed description, but rather by the claims appended hereto.

What is claimed is:

1. A method for drawing a graphical element in a computer-implemented drawing program, comprising:
   identifying an existing instance of a graphical element pattern that defines a graphical distribution of multiple occurrences of a source graphical element in a computer-implemented drawing program;
   associating a second graphical element with the existing instance of the graphical element pattern; and
   in response to said associating, positioning multiple occurrences of the second graphical element in accordance with the graphical element pattern.

2. The method of claim 1 wherein the second graphical element is a feature of a component.

3. The method of claim 1 wherein the second graphical element is a component.

4. The method of claim 1 further comprising reflecting a modification to the existing instance of the graphical element pattern in the multiple occurrences of the second graphical element.

5. The method of claim 4 wherein the modification adjusts a number of the multiple occurrences of the source element, and the number of the multiple occurrences of the second graphical element are modified to reflect the adjustment.

6. The method of claim 1 wherein:
   the graphical element pattern is represented by a pattern object that comprises the source graphical element and one or more pattern graphical elements with each pattern graphical element representing an occurrence of the source graphical element; and
   the one or more pattern graphical elements comprise one or more pattern instances with each pattern instance representing a graphical part of the pattern graphical element.

7. The method of claim 6 wherein the pattern object further comprises a missing tooth that indicates a position within a logical definition of the graphical element pattern that is skipped, eliminated, or otherwise suppressed.

8. The method of claim 1 wherein the graphical distribution is circular.

9. The method of claim 1 wherein the graphical distribution is rectangular.

10. The method of claim 1 wherein the graphical distribution is user-defined.

11. The method of claim 1 wherein the graphical element pattern, multiple occurrences, source graphical element, and second graphical element are displayed hierarchically with expandable lines in a browser window.

12. The method of claim 1 further comprising:
   breaking the association between the second graphical element with the existing instance of the graphical element pattern; and
   obtaining, for the second graphical element, a new independent instance of a second graphical element pattern based on the existing instance of the graphical element pattern.

13. A system for drawing a graphical element comprising:
   a computer system having a memory and a data storage device coupled thereto;
   a drawing program executing on the computer system, drawing program configured to:
   identify an existing instance of a graphical element pattern that defines a graphical distribution of multiple occurrences of a source graphical element;
   associate a second graphical element with the existing instance of the graphical element pattern; and
   in response to the association, positioning multiple occurrences of the second graphical element in accordance with the graphical element pattern.

14. The system of claim 13 wherein the second graphical element is a feature of a component.

15. The system of claim 13 wherein the second graphical element is a component.

16. The system of claim 13 wherein the computer program is further configured to reflect a modification to the existing instance of the graphical element pattern in the multiple occurrences of the second graphical element.

17. The system of claim 16 wherein the modification adjusts a number of the multiple occurrences of the source element, and the number of the multiple occurrences of the second graphical element are modified to reflect the adjustment.

18. The system of claim 13 wherein:
the system is an object-oriented computer system;
the graphical element pattern is represented by a pattern object that comprises the source graphical element and one or more pattern graphical elements with each pattern graphical element representing an occurrence of the source graphical element; and
the one or more pattern graphical elements comprise one or more pattern instances with each pattern instance representing a graphical part of the pattern graphical element.

19. The system of claim 18 wherein the pattern object further comprises a missing tooth that indicates a position within a logical definition of the graphical element pattern that is skipped, eliminated, or otherwise suppressed.

20. The system of claim 13 wherein the graphical distribution is circular.

21. The system of claim 13 wherein the graphical distribution is rectangular.

22. The system of claim 13 wherein the graphical distribution is user-defined.

23. The system of claim 13 wherein the graphical element pattern, multiple occurrences, source graphical element, and second graphical element are displayed hierarchically with expandable lines in a browser window.

24. The system of claim 13 wherein the drawing program is further configured to:
break the association between the second graphical element with the existing instance of the graphical element pattern; and
obtain, for the second graphical element, a new independent instance of a second graphical element pattern based on the existing instance of the graphical element pattern.

25. An article of manufacture comprising a program storage medium readable by a computer and embodying one or more instructions executable by the computer to perform a method for drawing a graphical element, the method comprising:
identifying an existing instance of a graphical element pattern that defines a graphical distribution of multiple occurrences of a source graphical element in a computer-implemented drawing program;
associating a second graphical element with the existing instance of the graphical element pattern; and
in response to said associating, positioning multiple occurrences of the second graphical element in accordance with the graphical element pattern.

26. The article of manufacture of claim 25 wherein the second graphical element is a feature of a component.

27. The article of manufacture of claim 25 wherein the second graphical element is a component.

28. The article of manufacture of claim 25 wherein the computer program is further configured to reflect a modification to the existing instance of the graphical element pattern in the multiple occurrences of the second graphical element.

29. The article of manufacture of claim 28 wherein the modification adjusts a number of the multiple occurrences of the source element, and the number of the multiple occurrences of the second graphical element are modified to reflect the adjustment.

30. The article of manufacture of claim 25 wherein:
the graphical element pattern is represented by a pattern object that comprises the source graphical element and one or mote pattern graphical elements with each pattern graphical element representing an occurrence of the source graphical element; and
the one or more pattern graphical elements comprise one or more pattern instances with each pattern instance representing a graphical part of the pattern graphical element.

31. The article of manufacture of claim 30 wherein the pattern object further comprises a missing tooth that indicates a position within a logical definition of the graphical element pattern that is skipped, eliminated, or otherwise suppressed.

32. The article of manufacture of claim 25 wherein the graphical distribution is circular.

33. The article of manufacture of claim 25 wherein the graphical distribution is rectangular.

34. The article of manufacture of claim 25 wherein the graphical distribution is user-defined.

35. The article of manufacture of claim 25 wherein the graphical element pattern, multiple occurrences, source graphical element, and second graphical element are displayed hierarchically with expandable lines in a browser window.

36. The article of manufacture of claim 25, the method further comprising:
breaking the association between the second graphical element with the existing instance of the graphical element pattern; and
obtaining, for the second graphical element, a new independent instance of a second graphical element pattern based on the existing instance of the graphical element pattern.

* * * * *